United States Patent
Cohen et al.

(10) Patent No.: US 11,530,527 B2
(45) Date of Patent: Dec. 20, 2022

(54) EXCAVATION BY WAY OF AN UNMANNED VEHICLE

(71) Applicant: ELTA SYSTEMS LTD., Ashdod (IL)

(72) Inventors: Ofir Cohen, Tzelafon (IL); Dina Appelman, Bat-Yam (IL)

(73) Assignee: ELTA SYSTEMS LTD., Ashdod (IL)

( * ) Notice: Subject to any disclaimer, the term of this patent is extended or adjusted under 35 U.S.C. 154(b) by 54 days.

(21) Appl. No.: 16/967,301

(22) PCT Filed: Jan. 10, 2019

(86) PCT No.: PCT/IL2019/050044
§ 371 (c)(1),
(2) Date: Aug. 4, 2020

(87) PCT Pub. No.: WO2019/155454
PCT Pub. Date: Aug. 15, 2019

(65) Prior Publication Data
US 2021/0025143 A1    Jan. 28, 2021

(30) Foreign Application Priority Data
Feb. 8, 2018   (IL) .......................................... 257428

(51) Int. Cl.
*E02F 9/26*       (2006.01)
*G05D 1/02*       (2020.01)

(52) U.S. Cl.
CPC .............. *E02F 9/262* (2013.01); *E02F 9/265* (2013.01); *G05D 1/027* (2013.01); *G05D 1/0274* (2013.01); *G05D 2201/0202* (2013.01)

(58) Field of Classification Search
CPC . E02F 9/262; E02F 9/265; E02F 9/205; E02F 3/34; G05D 1/027; G05D 1/0274;
(Continued)

(56) References Cited

U.S. PATENT DOCUMENTS

| 6,223,110 B1 | 4/2001 | Rowe et al. | |
| 6,363,632 B1 * | 4/2002 | Stentz | E02F 3/437 37/414 |

(Continued)

FOREIGN PATENT DOCUMENTS

| AU | 2014274649 A1 * | 6/2016 |
| EP | 1983305 A1 | 10/2008 |

(Continued)

*Primary Examiner* — Anne Marie Antonucci
*Assistant Examiner* — Connor L Knight
(74) *Attorney, Agent, or Firm* — Dorsey & Whitney LLP (57) ABSTRACT

A computer-implemented method for controlling an excavation task by an autonomous excavation vehicle comprising a scanning device, the excavation task being described by a target map, the method comprising using an excavation vehicle control system for: a) according to data from the scanning device, maintaining a map representing current terrain; b) moving a sensor-equipped digging implement for executing an excavation operation; c) receiving data indicative of current terrain topography from the sensor; d) updating the maintained map according to the data indicative of current terrain topography; and e) calculating an excavation operation according to the difference between the maintained map and the target map.

22 Claims, 5 Drawing Sheets

(58) Field of Classification Search
CPC ......... G05D 2201/0202; G05D 1/0246; G05D 1/0278; G01C 21/32
See application file for complete search history.

(56) References Cited

U.S. PATENT DOCUMENTS

| | | |
|---|---|---|
| 7,756,615 B2 | 7/2010 | Barfoot et al. |
| 8,983,738 B2 | 3/2015 | Oren et al. |
| 9,322,148 B2 | 4/2016 | Stratton et al. |
| 9,481,977 B1 | 11/2016 | Clar et al. |
| 2008/0059015 A1 | 3/2008 | Whittaker et al. |
| 2010/0223008 A1* | 9/2010 | Dunbabin ............... E02F 9/265 701/301 |
| 2012/0139325 A1* | 6/2012 | Norberg ................. G06N 20/10 299/10 |
| 2015/0361642 A1* | 12/2015 | Stratton ................. E02F 9/205 701/461 |
| 2017/0285655 A1* | 10/2017 | Katou .................... G09B 29/00 |
| 2018/0245317 A1* | 8/2018 | Ready-Campbell ...... E02F 3/32 |
| 2020/0033155 A1 | 1/2020 | Appelman et al. |
| 2020/0159227 A1 | 5/2020 | Cohen et al. |
| 2021/0191409 A1* | 6/2021 | Ready-Campbell ........................ G05D 1/0246 |

FOREIGN PATENT DOCUMENTS

| | | |
|---|---|---|
| IL | 250762 | 6/2017 |
| RU | 2572434 C1 | 1/2016 |

\* cited by examiner

EXCAVATION BY WAY OF AN UNMANNED VEHICLE

TECHNICAL FIELD

The presently disclosed subject matter relates to unmanned vehicles, and more particularly, to excavation by such vehicles.

BACKGROUND

An unmanned ground vehicle (UGV), also referred to as an uncrewed vehicle, is a motorized machine that travels and operates autonomously, by a tele-operator, or by personnel who cannot see the environment (for example when windows are non-existent, or are blocked for safety reasons).

One technical aspect of UGV operation is autonomous navigation. When navigating the terrain, the UGV must have awareness of obstacles that are located within the traversed area and use this information to determine a route that avoids the obstacles—so as to enable safe travel of the vehicle through the area.

UGVs can additionally conduct various other types of operations—including, for example, excavation. A UGV that is configured for excavation is equipped with a suitable digging implement such as, for example, a shovel or blade, as well as related subsystems for operating the digging implement—to accomplish operations such as digging, filling trenches, smoothing roads, clearing obstacles etc. Additionally the excavating UGV performs navigation as a part of its excavation activities—for example: the UGV might approach the site where excavation is required, lift material, and then navigate to move material away from the site. Unmanned excavators, tractors, bulldozers, and backhoes are examples of such UGVs.

GENERAL DESCRIPTION

Tracking a UGV with a GPS may be insufficiently accurate and suffer from discontinuities which can lead to mishaps such as collisions with obstacles or entering non-traversable areas. Additionally, GPS tracking sometimes provides insufficiently accurate vertical positioning data (i.e. altitude or "z-axis"). Other tracking techniques include use of an Inertial Navigation System (INS) which calculates the position of the UGV upon readings received from an Inertial Measurement Unit (IMU).

In some examples of the presently disclosed subject matter, the UGV is tracked using a map of the environment using, for example, an inertial navigation system with conjunction with realtime scanning—as disclosed in "METHOD OF NAVIGATING AN UNMANNED VEHICLE AND SYSTEM THEREOF" (Israeli patent application 250762, filed 29 Jun. 2017, which is incorporated herein by reference). The map can be generated and repeatedly updated by scanning the area surrounding the UGV using one or more scanning devices operated from onboard the UGV. The resulting map is thus generated relative to the UGV (sometimes referred to herein as a "relative map"), for example the map represents an area surrounding the UGV.

The map can comprise a grid of cells, wherein each cell represents part of the mapped area. Between successive updates of the map which can be performed according to readings received from the scanning device, the UGV advances in accordance with the path, and its location can be tracked based on readings received from an inertial navigation system (INS).

Thus, the UGV continuously navigates through the traversed area and avoids obstacles by repeatedly scanning the area surrounding the UGV, generating a relative map of the area based upon the scanning output data, and using an INS for updating the location of the UGV and navigating the UGV according to the mapping data.

In some examples of the presently disclosed subject matter, a scanning device may be located in a position, such as on the top of the UGV, which does not enable scanning of terrain immediately surrounding the vehicle. In the case of a UGV configured for excavation, the unscannable terrain can include the area that is being manipulated by the vehicle's digging implement. In such a situation it may be necessary for the vehicle to move away from the site in order to properly scan the area and update the terrain map.

One aspect of the disclosed subject matter relates to a method of navigating an unmanned ground vehicle (UGV), the vehicle comprising a scanning device and an Inertial Navigation System (INS) being operatively connected to a computer, the method comprising: repeatedly operating the scanning device for executing a scanning operation, comprising scanning an area surrounding the vehicle, to thereby generate respective scanning output data, for each scanning operation, operating the computer for generating, based on the scanning output data, a map representing at least a part of the area, the map being relative to a location of the UGV vehicle, wherein the map comprises cells, each cell being classified to a class selected from at least two classes, comprising traversable and non-traversable, and characterized by dimensions larger than an accumulated drift value of the INS over a predefined distance; receiving INS data indicative of a current location of the UGV relative to a previous location; and for each INS data received, updating a location of the UGV relative to at least non-traversable cells.

In some examples of the presently disclosed subject matter, the UGV can include a sensor-equipped digging implement, and an excavation control subsystem which continually monitors the status of the physical digging implement. The excavation control subsystem can infer terrain topography information from this equipment status information, and can integrate the terrain mapping information into the map that is maintained according to the scanning device and INS.

In this manner, the UGV can conduct an excavation without the need to continually back away from the area of its excavation.

According to one aspect of the presently disclosed subject matter there is provided a computer-implemented method for controlling an excavation task by an autonomous excavation vehicle comprising a scanning device, the excavation task being described by a target map, the method comprising using an excavation vehicle control system for: a) according to data from the scanning device, maintaining a map representing current terrain; b) moving a sensor-equipped digging implement for executing an excavation operation; c) receiving data indicative of current terrain topography from the sensor; d) updating the maintained map according to the data indicative of current terrain topography: and c) calculating an excavation operation according to the difference between the maintained map and the target map.

In addition to the above features, the method according to this aspect of the presently disclosed subject matter can comprise one or more of features (i) to (ix) listed below, in any desired combination or permutation which is technically possible:
- (i) the method additionally comprising: repeating steps b)-e) until the maintained map is substantially identical to the target map
- (ii) the sensor is adapted to provide terrain topography data pertaining to a location that is inaccessible to the scanning device
- (iii) the location that is inaccessible to the scanning device comprises an area that is beneath the vehicle
- (iv) the data indicative of current terrain topography comprises the location of the digging implement.
- (v) the data indicative of current terrain topography comprises data indicative of the quantity of material contained in the digging implement.
- (vi) the data indicative of current terrain topography comprises data indicative of the composition of material contained in the digging implement.
- (vii) the maintained terrain map is three-dimensional.
- (viii) the maintained terrain map is 2.5-dimensional.
- (ix) the autonomous excavation vehicle comprises an inertial navigation system (INS).

According to another aspect of the presently disclosed subject matter there is provided an unmanned ground vehicle (UGV), comprising: a scanning device for scanning an area surrounding the UGV, to thereby provide scanning output data providing information about distances between objects in the area and the UGV in a multiplicity of directions; an inertial navigation system (INS) providing data indicative of a current location and orientation of the UGV relative to a previous location and orientation; a vehicle control sub-system configured to receive vehicle control instructions and control the UGV in accordance with the instructions; a first processor configured to: repeatedly operate the scanning device for executing a scanning operation, comprising: scanning an area surrounding the vehicle, the area having a predefined area dimensions, to thereby generate respective scanning output data; for each scanning operation, based on the scanning output data, a map representing at least a part of the area, the map being relative to a location of the UGV, wherein the map comprises cells, each cell is classified to a class selected from the group consisting of traversable and non-traversable, and characterized by dimensions larger than an accumulated drift value of the INS over a predefined distance; receive INS data indicative of a current location and orientation of the UGV relative to a previous location and orientation; and for each INS data received, update a location of the UGV relative to non-traversable cells; a second processor configured to: according to data from the scanning device, maintaining a map representing current terrain; moving a sensor-equipped digging implement for executing an excavation operation; receiving data indicative of current terrain topography from the sensor: updating the maintained map according to the data indicative of current terrain topography: and calculating an excavation operation according to the difference between the maintained map and the target map.

In addition to the above features, the method according to this aspect of the presently disclosed subject matter can comprise one or more of features (i) listed below:
- (i) the first processor and the second processor are the same processor.

According to another aspect of the presently disclosed subject matter there is provided a computer program product comprising a computer readable storage medium retaining program instructions, which program instructions when read by a processor, cause the processor to perform a method comprising: according to data from the scanning device, maintaining a map representing current terrain; moving a sensor-equipped digging implement for executing an excavation operation: receiving data indicative of current terrain topography from the sensor; updating the maintained map according to the data indicative of current terrain topography; and calculating an excavation operation according to the difference between the maintained map and the target map.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "determining", "regarding", "representing", "comparing", "checking", "generating", "matching", "updating", "creating" or the like, refer to the action(s) and/or process(es) of a computer that manipulate and/or transform data into other data, said data represented as physical, such as electronic, quantities and/or said data representing the physical objects.

The terms "computer" or "processing unit" or "control unit" should be expansively construed to include any kind of electronic device with data processing circuitry, which includes a computer processor as disclosed herein below (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) and executes computer instructions (e.g. loaded on a computer memory) as disclosed herein.

The operations in accordance with the teachings herein may be performed by a computer specially constructed for the desired purposes or by a general-purpose computer specially configured for the desired purpose by a computer program stored in a computer readable storage medium. In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

The term "scanning device" as used herein should be expansively construed to include any kind of device configured to identify that an object is present at a specific distance and at a specific direction relative to the device. Examples of scanning devices include, but are not limited to: laser scanners (including LIDAR), RADAR, image sensor, sonar, etc. A scanning device can scan for example, 360° on a plane surrounding the device, or at some other smaller scanning angle (e.g. 180°). Alternatively, the scanning device can scan a sphere or part thereof around the UGV. A scanning device can provide information for generating a 3 dimensional map of the scanned area. In some examples, in order to save resources, a 2.5 dimensional map may be generated, as detailed below.

The term "unmanned ground vehicle" (UGV) as used herein should be expansively construed to include any kind of vehicle that can be operated either autonomously, by a tele-operator, or by on-board personnel who cannot see the environment and steers in accordance with a map or with explicit steering instructions.

The term "map" as used herein should be expansively construed to include any data structure representing a geographical area. A map may be absolute, i.e., comprise indications of absolute coordinates of an object or a location, or relative, i.e., comprise information about locations or objects, regardless of their locations in absolute coordinates. A map may consist of a reference to another map, combined with information regarding how the reference map has changed or should change. A map may be represented on a computerized display device, paper or any other tangible medium. In some examples of the disclosure, a 2.5 dimensional map may be generated and used. A 2.5 dimensional map relates to a map which indicates the lowest height of an obstacle above the ground, i.e., the vertical distance between the ground and the obstacle at each ground location. In other words, there is provided for each ground location, the height of the free space above the ground. Thus, the information in the map indicates for each location the clearance height for the UGV. For example, the lowest height of a treetop or a bridge at a certain point. It will be appreciated that for obstacles that are on the ground, such as a house or a trunk of a tree, this height may be indicated as zero. Thus, for path planning purposes, the clearance height may be taken into account, when determining, for example, whether the UGV can pass under a tree or a bridge.

FIGS. 1, 2, and 3 illustrate types of operations that can be conducted by an excavator UGV, according to some examples of the presently disclosed subject matter.

Reference is now made to FIG. 1, illustrating a stylized before-and-after illustration of a mound-clearing excavation task, in accordance with some examples of the current subject manner.

Figure 1A:
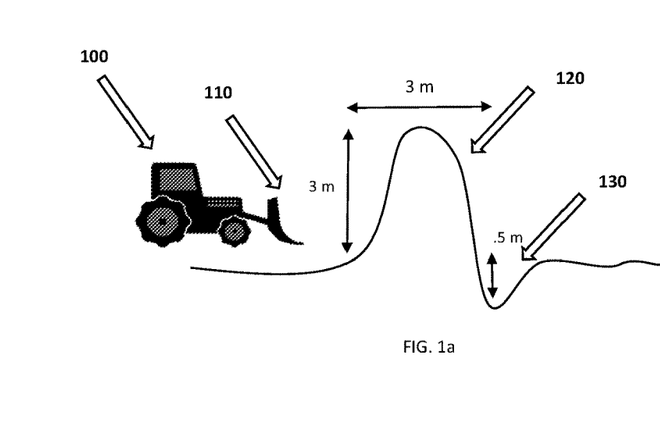
FIG. 1 is a stylized before-and-after illustration of a mound-clearing excavation task, in accordance with some examples of the presently disclosed subject matter.

FIG. 1a shows an excavator UGV 100 including a Digging Implement 110 (e.g. shovel or blade) positioned to begin the operation. The excavator UGV 100 is positioned on flat terrain. In front of the excavator UGV 100 is a mound 120 that is 3 meters across, and 3 meters high. On the side of the mound that is behind the excavator UGV 100, there is a half-meter deep trench 130.

Figure 1B:
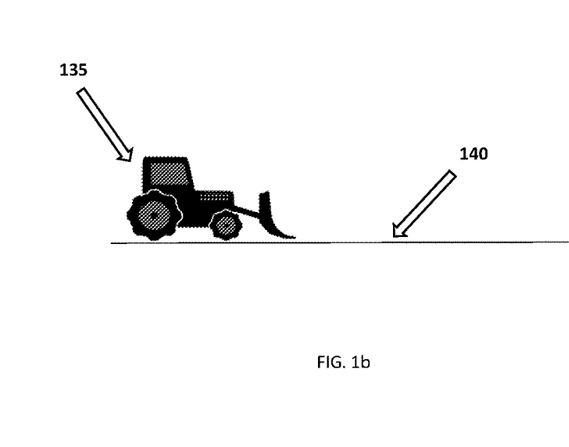

FIG. 1b shows the excavator UGV 135 on flat terrain 140, after the completion of the operation i.e. the mound 120 has been removed and the trench 130 has been filled.

Reference is now made to FIG. 2, which is a stylized before-and-after illustration of a trench-digging excavation task, in accordance with some examples of the current subject manner.

Figure 2A:
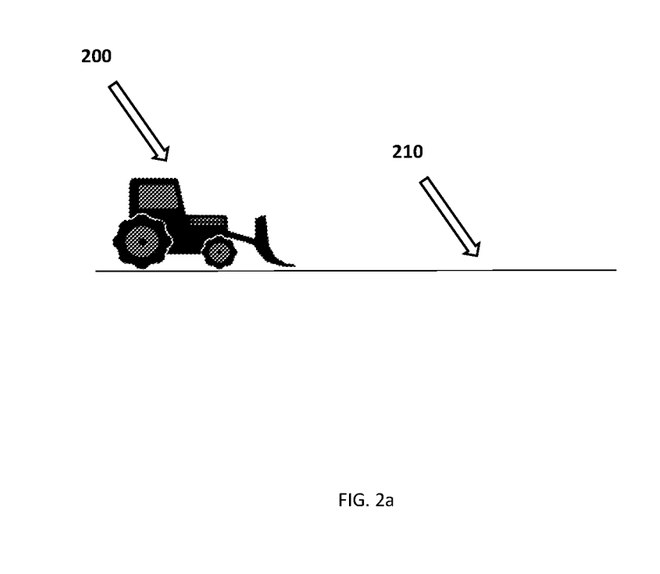
FIG. 2 is a stylized before-and-after illustration of a trench-digging excavation operation, in accordance with some examples of the presently disclosed subject matter.
Figure 2B:
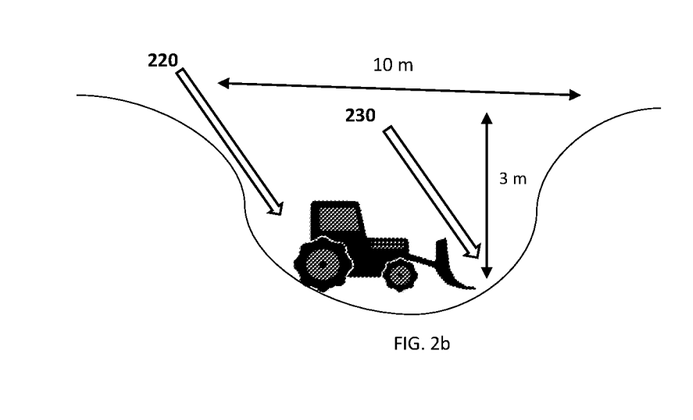

FIG. 2a shows an excavator UGV 200 positioned on flat terrain 210. FIG. 2b shows the excavator UGV after the completion of an operation i.e. there is now a trench 230 10 meters across and 3 meters deep.

Reference is now made to FIG. 3, which is a stylized before-and-during illustration of a rock-clearing excavation task, in accordance with some examples of the current subject manner.

Figure 3A:
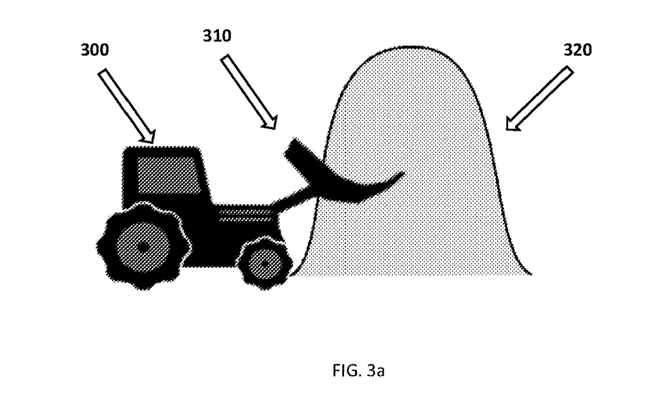
FIG. 3 is a stylized before-and-during illustration of a rock-clearing excavation task, in accordance with some examples of the presently disclosed subject matter.

FIG. 3a shows an excavator UGV 300, positioned to begin the operation. The Digging Implement 310 of the excavator UGV is positioned to begin moving rocks from a pile 320.

Figure 3B:
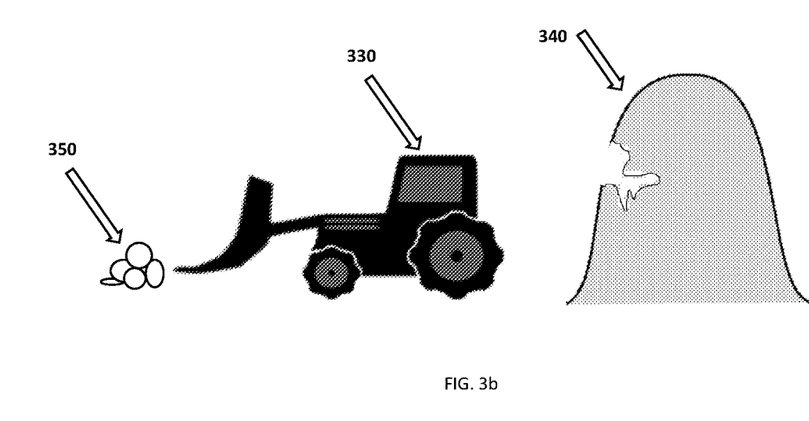

FIG. 3b shows that some rocks have been moved from the pile 340, even as the shape of the rock pile 340 remains. Meanwhile, the excavator UGV 330 has dropped some rocks 350 from the pile 340 at some distance from the original site.

Figure 3C:
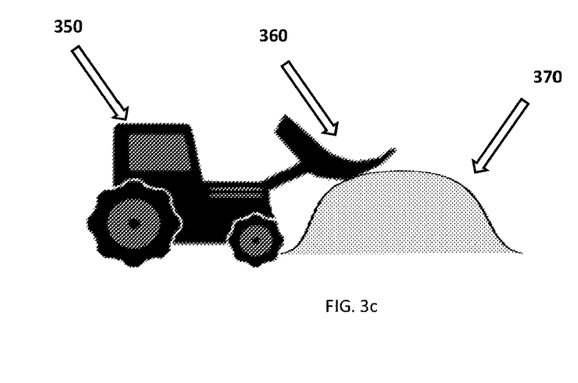

In FIG. 3c, the rock pile 370 is shorter (for example, because the pile 370 has collapsed due to the absence of the rocks that were removed in FIG. 3b), while the excavator UGV 350 has placed its Digging Implement 360 at a location where there are no rocks or earth present (for example, the map maintained by the UGV 350 may not have received updated information about the collapsed pile 370, and accordingly moved its Digging Implement 360 to a location where rocks were located previously). In some examples of the presently disclosed subject matter, the implement can be configured to provide the control systems of the UGV with Digging Implement 360 position data, or with data regarding the amount or composition of the material contained in the Digging Implement 360. The UGV control systems can use this data to update the UGV current topography map—as will be described in more detail below.

Figure 4:
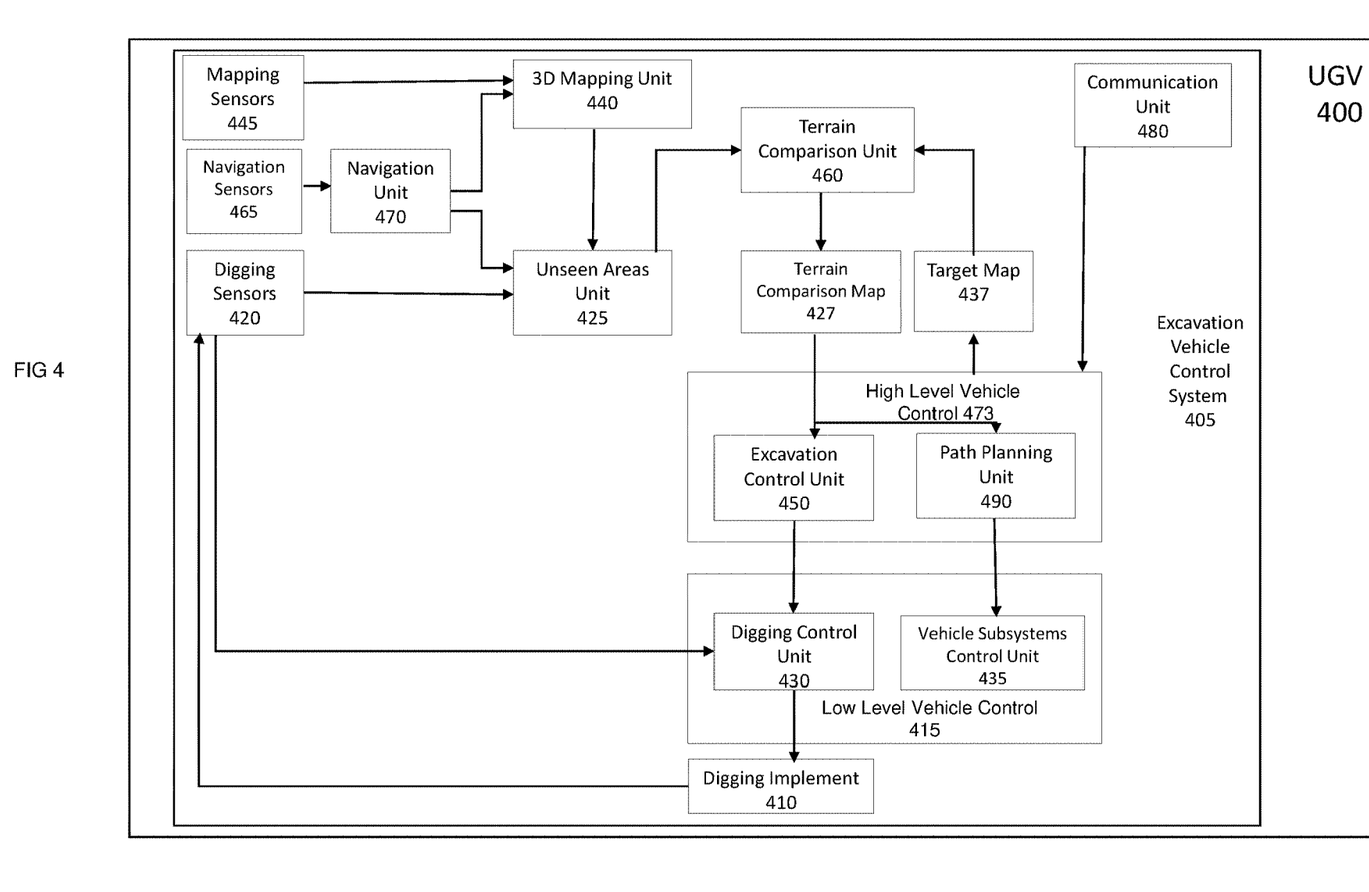
FIG. 4 illustrates a schematic block diagram of an excavation-capable UGV, in accordance with some examples of the presently disclosed subject matter; and, FIG. 5 illustrates a generalized flow-chart of a method for controlling the excavation conducted by a UGV, in accordance with some examples of the presently disclosed subject matter.

Reference is now made to FIG. 4, showing a schematic block diagram of an excavation-capable UGV 400, in accordance with some examples of the presently disclosed subject matter. The UGV 400 can include an Excavation Vehicle Control System 405, which can include units for control and monitoring of an excavation task. Communication between the units can take place, for example, via a wired network technology such as ethernet or a wireless network technology such as Bluetooth, or any other appropriate communication infrastructure, known in the art.

The Communications Unit 480 can, for example, receive data such as excavation commands from, for example, a remote operator (human or machine) and it can, for example, transmit data such as excavation UGV status information to such an operator. The transmission/reception can take place via a cellular communication network or any other suitable wireless or wired communication medium.

In particular, the Communications Unit 480 can receive a command from a remote manager to perform an excavation operation so that the terrain matches a particular target map. The High Level Vehicle Control 473 grouping of units can be operably connected to the Communications Unit 480 and can store received target map data to the structure Target Map 437.

The Digging Implement 410 is an implement used by the excavation vehicle to lift up, deposit, push drag or otherwise move earth or other excavatable material. The Digging Implement 410 can be, for example, an excavator bucket or shovel, a bulldozer blade of a particular type (such as a straight blade, tilting blade, combtooth blade etc.), or a backhoe bucket etc. The Digging Implement 410 can be equipped, for example, with a cutting edge, and can be tailored for moving a specific type of material e.g. moving dirt, moving quarry, moving gravel, moving snow, moving sand etc. In some examples of the presently disclosed subject matter, the Digging Implement 410 can hold excavated or other material within it. In some examples of the presently disclosed subject matter, the Digging Implement 410 can push excavated or other material along the ground as the vehicle moves. In some examples, the Digging Implement 410 can be attached to a digger arm (not shown) which is itself attached to the vehicle.

The Digging Sensors 420 can be operably connected to the Digging Implement 410 and can receive and/or detect information pertaining to the Digging Implement 410. The Digging Sensors 420 can comprise a single sensor device or multiple sensor devices.

In some examples of the presently disclosed subject matter, the Digging Sensors 420 can detect the position and orientation of the Digging Implement 410.

The position and orientation data may include, for example, the height of the Digging Implement 410 relative to the bottom of the excavation vehicle or relative to the ground, the distance of extension of the Digging Implement 410 relative to the front of the excavation vehicle, the bucket trajectory of the Digging Implement 410, the horizontal tilt or vertical tilt of the Digging Implement 410 etc.

In some examples, the Digging Sensors 420 can detect data pertaining to the current weight or current volume of excavated material or other material that is currently being contained in, pushed, or otherwise manipulated by the Digging Implement 410.

The position, orientation, and content detection functionality of the Digging Sensors 420 can be implemented mechanically, for example: by including a spring-based scale for measuring weight of material contained within the Digging Implement 410, or by including mechanical components that measure the positions of the UGV components (such a digger arm) that can move the Digging Implement 410. The position, orientation, and content detection functionality of the Digging Sensors 420 can be implemented electronically, for example: by including a scanning device e.g. a camera-based image analysis system that can evaluate (e.g. by using an onboard image processor configured to execute appropriate image processing algorithms) the volume (quantity) and composition of material in the Digging Implement 410, as well as detect the distance of the Digging Implement 410 from the ground, the front of the vehicle, the bottom of the vehicle and/or other points of reference. The status detection functionality of the Digging Sensors 420 can be implemented by other suitable mechanisms, or by suitable combinations of the aforementioned.

The Navigation Sensors 465 can be a self-contained navigation system which use measurements provided by an Inertial Measurement Unit to track the position, velocity, and orientation of an object relative to a starting position, orientation, and velocity.

In some examples, the Navigation Sensors 465 can enable inertial navigation with obstacle avoidance as shown in FIG. 3 of the aforementioned Israeli patent application 250762.

The Mapping Sensors 445 can comprise a scanning device (e.g. cameras, laser, LIDAR, etc.) that surveys the area around the vehicle.

The Digging Control Unit 430 can be operably connected to the Digging Implement 410 and can control the movement of the Digging Implement 410. The Digging Control Unit 430 can control the Digging Implement 410 using electronic, mechanical, or other suitable mechanisms, or combinations thereof.

In some examples of the presently disclosed subject matter the Digging Control Unit 430 can, for example, raise and lower the Digging Implement 410 to a particular height. In some examples the Digging Control Unit 430 can, for example, extend and retract the Digging Implement 410 to a particular distance relative to the the ground, the bottom of the excavation vehicle 100, or another reference point. In some examples the Digging Control Unit 430 can, for example, increase and decrease the bucket angle with respect to the ground (bucket trajectory) of the Digging Implement 410. In some examples the Digging Control Unit 430 can, for example, increase and decrease the horizontal tilt or vertical tilt of the Digging Implement 410.

The Digging Control Unit 430 can be operably connected to the Digging Sensors 420 and can, for example, receive status information regarding the Digging Sensors 420. In some examples the Digging Control Unit 430 can, for example, receive data regarding the activation, deactivation, calibration, or other status information pertaining to the operation of the Digging Sensors 420.

The Vehicle Subsystems Control Unit 435 can control various subsystems of the excavation vehicle, including, for example, the steering, acceleration, and braking subsystems of the vehicle etc.

The Low Level Vehicle Control 415 can be a grouping of units that can comprise the Digging Control Unit 430 and the Vehicle Subsystems Control Unit 435.

The Navigation Unit 470 can be operably connected to the Navigation Sensors 465 and can receive the Navigation Sensors 465 data such as current vehicle location and supply it to the Unseen Areas Unit 425.

The 3D Mapping Unit 440 can be operably connected to the Mapping Sensors 445 and to the Navigation Unit 470. The 3D Mapping Unit 440 can generate and maintain mapping information regarding the terrain immediately surrounding the vehicle as well as the larger area. The mapping information can be generated based on data obtained for example, by the Mapping Sensors 445 (utilizing for example a scanning device) and the inertial navigation techniques performed by the Navigation Unit 470 in conjunction with the Navigation Sensors 465.

The Unseen Areas Unit 425 can be operably connected to the 3D Mapping Unit 440, and the Digging Sensors 420, and can, for example, receive 3D mapping data from the 3D Mapping Unit 440, as well as sensor data from the Digging Sensors 420.

The location of the vehicle can be known from the 3D Mapping Unit 440 data and the relative position and orientation of the Digging Implement 410 can be determined based on the Digging Sensors 420. From this information, the map location and orientation of the Digging Implement 410 can be inferred.

The Unseen Areas Unit 425 can utilize this data to, for example, derive topographical information pertained to terrain areas that are not within line-of-sight—or are otherwise inaccessible to the mapping unit—for example: an area currently being dug out. Derivation of topographical information from Digging Sensors 420 data is described in more detail below, with reference to FIG. 5.

Topographical information—together with relevant contextual mapping information—can then be made available to, for example, the Terrain Comparison Unit 460 as described below.

The Terrain Comparison Unit 460 can be operably connected to the Unseen Areas Unit 425. The Terrain Comparison Unit 460 can receive, for example, topographical data as well as, for example, associated 3D mapping data from the Unseen Areas Unit 425 and accordingly update, for example, the data structure Terrain Comparison Map 427.

The Terrain Comparison Map 427 can be a data structure maintained by, for example, the Terrain Comparison Unit 460, and utilized by, for example, the Excavation Control Unit 450. The Terrain Comparison Map 427 can be a representation of terrain as it changes during the process of excavation. The Terrain Comparison Map 427 can include metadata which indicates to the Excavation Control Unit 450 the actions that need to be performed in order to complete an excavation operation. The Terrain Comparison Unit 460 can utilize the Target Map 437 in its maintenance of the Terrain Comparison Map 427—for example the Terrain Comparison Unit 460 can utilize the Target Map 437 to evaluate what excavation operations are remaining and accordingly create metadata in the Terrain Comparison Map 427.

The Digging Control Unit 430 can be operably connected to the Excavation Control Unit 450 and can receive instructions from the Excavation Control Unit 450. The instructions from the Excavation Control Unit 450 to the Digging Control Unit 430 can be—for example—instructions pertaining to the movement of the Digging Implement 410 as demonstrated above. The actual position and orientation of the Digging Implement 410 as indicated by the Digging Sensors 420 can differ from the position to which the Digging Control Unit 430 previously directed its placement. For example, it might happen that the Digging Control Unit 430 directs the placement of Digging Implement 410 to a particular coordinate, but a physical obstacle makes it physically impossible for Digging Implement 410 to be placed there. In this situation, the Digging Sensors 420 can indicate the actual location.

The Vehicle Subsystems Control Unit 435 can control the physical subsystems (by way of non-limiting example: steering, brakes, etc. but not the digging implement) utilized in the course of carrying out navigation and digging tasks.

The High Level Vehicle Control 473 can be a grouping of units that can comprise the Path Planning Unit 490 and the Excavation Control Unit 450. Additionally, the High Level Vehicle Control 473 can communicate with the Communication Unit 480, and write target map data to the Target Map 437.

The Path Planning Unit 490 can be operably connected to the Terrain Comparison Map 427. The Path Planning Unit 490 can be operably connected to the Vehicle Subsystems Control Unit 435 and can send commands to the Vehicle Subsystems Control Unit 435. The Path Planning Unit 490 can be responsible for high level control of vehicle maneuvering (e.g. determining when the metadata of the Terrain Comparison Map 427 indicate that the position and orientation of the vehicle need to change) and can issue appropriate commands to the Vehicle Subsystems Control Unit 435.

The Excavation Control Unit 450 can, for example, control the integrated digging operation of the excavation vehicle and direct other control units so that the UGV 400 can accomplish useful multi-stage tasks such as digging, moving earth, and dropping the earth in another location so as to dig out a particular area.

The Excavation Control Unit 450 can be operably connected to the Digging Control Unit 430 and the Terrain Comparison Map 427.

The Excavation Control Unit 450 can control the vehicle's digging and moving of earth or other materials (via the Digging Control Unit 430). The Excavation Control Unit 450 can send commands to and can receive status information from the Digging Control Unit 430.

The operation of the Excavation Control Unit 450 is described in more detail below with reference to FIG. 5.

Figure 5:
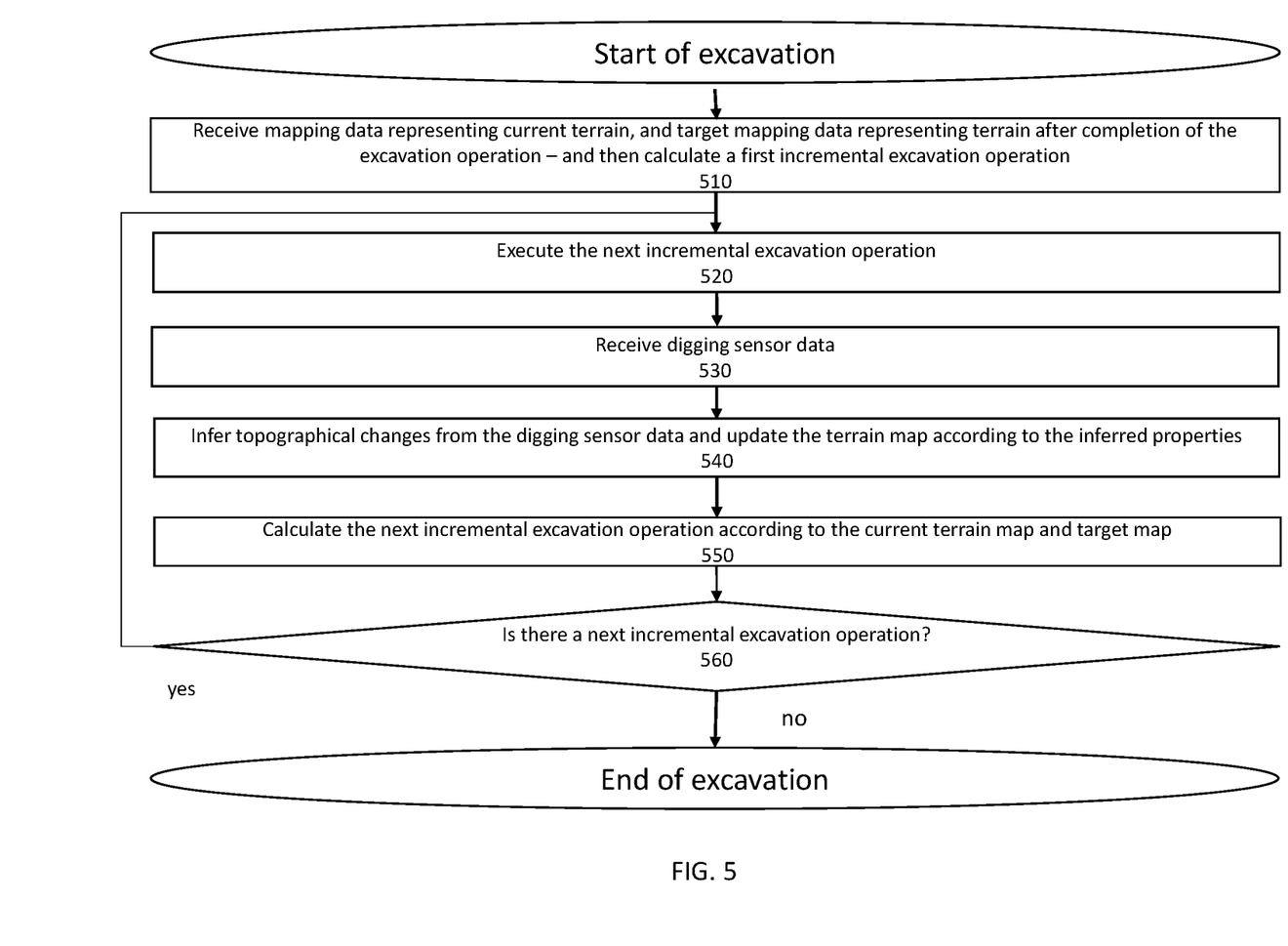

Attention is now directed to FIG. 5, which depicts a generalized flow diagram of the excavation sequence, according to certain examples of the presently disclosed subject matter. It is noted that while some operations are described herein with reference to elements described in FIG. 4 above, this is done by way of example only and should not be construed as limiting in any way.

It is noted that during excavation there can be a temporary inability of the Mapping Sensors 445 to scan the relevant area (for example when a trench being dug is inaccessible to the view of the scanning device, outside of the view of the scanning device). Scanning the area so as to monitor the progress of the excavation could then necessitate the UGV to move away from the digging site in order to properly scan the are being dug. The method disclosed in FIG. 5 can enable mapping of the area being dug while eliminating the need for the UGV to move away from the digging site.

The vehicle (e.g. the Terrain Comparison Unit 460) can receive (510) mapping data (or "map") representing the current terrain from, for example, the 3D Mapping Unit 440. In some examples the data from the 3D Mapping Unit 440 includes data from, for example, mapping sensors 445. In some examples, mapping sensors 445 comprise a scanning device (for example: LIDAR, cameras, laser etc.) that can provide scanning output data providing information about distances between objects in the area and the UGV in a multiplicity of directions. In some examples the data from the 3D Mapping Unit 440 includes data from, for example, navigation sensors 465.

The vehicle (for example the Excavation Control Unit 450) can receive (510) target mapping data (also termed "target map") representing the intended configuration of the terrain after completion of an excavation operation.

In some examples of the presently disclosed subject matter, the Communication Unit 480 can receive target mapping data from, for example, a remote manager. The Communication Unit 480 can then, for example, communicate the target mapping data to the High Level Vehicle Control 473 unit group, which can then store the data to the structure Target Map 437.

The term "target mapping data" is herein used to provide simplicity and clarity, and denotes data indicative of completion of the excavation task. In some examples, the target mapping data is simply a representation of the intended terrain result using the same mapping method being used by the 3D Mapping Unit 440.

In other examples, the target mapping data can consist, for example, of data representing the difference between an initial terrain configuration and the intended terrain result. By way of non-limiting example: the data indicative of completion of the excavation task could consist of eight coordinates indicating the corners of a trench to be dug. If the terrain is currently flat, the target map data might specify that there should be a trench of dimensions 2 meters deep×2 meters wide×50 meters long in a particular location, and that a ramp (in a particular location) with 20 degrees incline and a certain width and length should connect the trench to the level ground.

In some examples, the reception of the target mapping data by the vehicle can in effect constitute a command to carry out a particular excavation task, i.e. in this particular case the digging of the trench with the specific dimensions is the excavation task.

Performance of the excavation task can be complex. For example, digging a trench can involve moving the vehicle to a particular location, manipulating the Digging Implement 410 to remove earth, moving the vehicle to a different location, dropping the earth etc. The vehicle (e.g. the Terrain Comparison Unit 460) can maintain, for example, a computer-implemented data structure Terrain Comparison Map 427 describing the current terrain as it changes during excavation.

The vehicle (e.g. the Terrain Comparison Unit 460) can include computer-implemented methods for comparing the current terrain (for example: as reflected by data from the 3D mapping unit and stored in Terrain Comparison Map 427) with the target terrain (for example: as stored in Target Map 437), and determining the sequence of individual manipulations of vehicle components (such as raising or lowering the Digging Implement 410, extending or retracting the Digging Implement 410, turning the vehicle wheels, accelerating the engine, braking, etc.) which are required to complete the excavation task. These individual manipulations of vehicle components are hereforward termed "incremental excavation operations" or simply "excavation operations".

Having received a target map (for example, stored in Target Map 437), the vehicle (e.g. the Terrain Comparison Unit 460) can, for example, calculate (510) one or more incremental excavation operations to be performed in order to complete a commanded excavation task.

In some examples of the presently disclosed subject matter, the Terrain Comparison Unit 460 can then, for example, write metadata describing these incremental excavation operations to the Terrain Comparison Map 427. When the current terrain is identical to the target map, there are, for example, no more incremental excavation operations written to the Terrain Comparison Map 427.

In some examples of the presently disclosed subject matter, the Terrain Comparison Unit 460 can then, for example, write data describing these incremental excavation operations to a structure separate from the Terrain Comparison Map 427 (such as a command queue).

Following the calculation of the next incremental operation(s), the vehicle (for example: a unit such as the Digging Control Unit 430 being controlled by the Excavation Control Unit 450 reading from the Terrain Comparison Map 427) can, for example, execute (520) the first pending incremental excavation operation (for example: raising or lowering the Digging Implement 410, extending or retracting the Digging Implement 410).

It is noted that on some occasions, the determined incremental excavation operation might not involve the Digging Implement 410, but instead, for example, accelerating the engine, activating brakes or other operations controlled by, for example, the Vehicle Subsystems Control Unit 435. On such occasions, the Path Planning Unit 490 can read the incremental excavation operation from the Terrain Comparison Map 427 and instruct the Vehicle Subsystems Control Unit 435 to perform the incremental excavation operation.

The vehicle (e.g. the Unseen Areas Unit 425) can next receive (530) Digging Sensors 420 data from the Digging Sensors 420. This data can include, for example, the position of the Digging Implement 410, the horizontal or vertical tilt of the Digging Implement 410, the trajectory of the Digging Implement 410, the volume or mass of the material currently contained in the Digging Implement 410 etc. The Digging Sensors 420 data can comprise, for example, information that is sensed as a consequence of the recently executed incremental excavation operation.

By way of non-limiting example, if the recently executed incremental excavation placed the Digging Implement 410 at a location where—according to the current terrain map—earth is located, the measurement of material contained in the Digging Implement 410 as indicated in the Digging Sensors 420 data can reflect the amount of earth that is actually present at that location as will be described below.

Next, the vehicle (e.g. the Unseen Areas Unit 425) can infer (540) topographic information from the Digging Sensors 420 data, and then the vehicle (e.g. the Terrain Comparison Unit 460) can update (540) the Terrain Comparison Map 427 accordingly to reflect, for example, the actual current terrain topography. In some examples, the vehicle (e.g. the Terrain Comparison Unit 460) can update (540) the Terrain Comparison Map 427 to reflect, for example, the required next incremental excavation operations.

The following are non-limiting examples of how the Unseen Areas Unit 425 can infer topographic information from the data that it receives from Digging Sensors 420:

a) Consider a circumstance where i) the most recently executed incremental excavation operation was moving the Digging Implement 410 to a particular coordinate in three-dimensional space, and ii) Digging Sensors 420 data now indicates that the Digging Implement 410 is located at that particular coordinate and is empty. This might occur, for example, if the vehicle (e.g. Excavation Control Unit 450) has been excavating earth from e.g. a mound at a particular location, and the mound has now been cleared (i.e. the excavation is complete).

This might also occur, for example, if the vehicle (e.g. Excavation Control Unit 450) attempted to excavate earth from a particular location, but the earth was no longer present (for example because the earth fell away on its own).

The Unseen Areas Unit 425 can regard this Digging Sensors 420 data as an indication there is no earth, obstacle or other object at the current Digging Implement 410 coordinate, and that there is no earth, obstacle or other object on the path between the previous Digging Implement 410 3D coordinate and the current Digging Implement 410 3D coordinate. The Terrain Comparison Unit 460 can receive this information from the Unseen Areas Unit 425 and then update the Terrain Comparison Map 427 accordingly.

b) Consider a circumstance where i) the most recently executed incremental excavation operation was moving the Digging Implement 410 to a particular 3D coordinate, and ii) Digging Sensors 420 data now indicates that the Digging Implement 410 is located at a coordinate—different from the one previously intended—located on the path between the previous Digging Implement 410 3D coordinate and the intended Digging Implement 410 3D coordinate and that the Digging Implement 410 contains earth.

The Unseen Areas Unit 425 can regard this Digging Sensors 420 data as an indication that there exists earth or some other type of unanticipated obstacle at the current Digging Implement 410 coordinate. The Terrain Comparison Unit 460 can then update the Terrain Comparison Map 427 accordingly.

Following the update of the Terrain Comparison Map 427, the Terrain Comparison Unit 460 can compare the Terrain Comparison Map 427 with the Target Map 437 and calculate (550) one or more next incremental excavation operations. As described above, the Terrain Comparison Unit 460 can, for example, write metadata to the Terrain Comparison Map 427 to indicate to the Excavation Control Unit 450 which incremental excavation operations remain to be performed. If the Terrain Comparison Map 427 is substantially the same the Target Map 437, then there is no next incremental excavation operation.

The vehicle (e.g. by the Excavation Control Unit 450) next checks (560) if a next incremental excavation remains to be performed. If not, then the excavation task has completed. Otherwise the vehicle (eg. the Excavation Control Unit 450) performs another cycle by executing (520) the next incremental excavation operation.

It is noted that the teachings of the presently disclosed subject matter are not bound by that described with reference to FIG. 5 and the components described with reference to FIG. 4. Equivalent and/or modified functionality can be consolidated or divided in another manner and can be implemented in any appropriate order or combination of software, firmware and hardware and executed on a suitable device. The arrows shown in FIG. 4 exemplify possible transfer of commands and/or data between components, but do not indicate that such commands/data are required or that commands/data do not flow in the opposite direction or between other components.

It is to be understood that the invention is not limited in its application to the details set forth in the description contained herein or illustrated in the drawings. The invention is capable of other examples and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the examples of the invention as hereinbefore described without departing from its scope, defined in and by the appended claims.

The invention claimed is:

1. A computer-implemented method of performing an excavation task by an autonomous excavation vehicle wherein a desired result of the excavation task being described by a target map, the computer-implemented method comprising:
operating a scanning device onboard the excavation vehicle for repeatedly scanning an area surrounding the vehicle, to thereby generate respective scanning output data;
maintaining, based on the scanning output data, a map representing at least a part of the area, the map being relative to a location of the vehicle and comprises cells that are characterized by a size equal or larger than an accumulated drift value of an INS onboard the vehicle over a predefined distance;
receiving from the INS, INS data indicative of a current location and orientation of the vehicle relative to a previous location and orientation; and
updating a location of the vehicle relative to the cells in the map based on the INS data;
executing an excavation sequence comprising:
moving a sensor-equipped digging implement for executing an excavation operation;
receiving data indicative of current terrain topography from the sensor-equipped digging implement;
updating the map according to the data indicative of current terrain topography; and
calculating an excavation operation according to a difference between the map and the target map.

2. The computer-implemented method of claim 1, wherein the excavation sequence is repeated until the map is substantially identical to the target map.

3. The computer-implemented method of claim 1, wherein the sensor-equipped digging implement is adapted to provide terrain topography data pertaining to a location that is inaccessible to the scanning device.

4. The computer-implemented method of claim 3, wherein the location that is inaccessible to the scanning device includes an area that is beneath the vehicle.

5. The computer-implemented method of claim 1, wherein the data indicative of current terrain topography includes the location of the digging implement relative to the map.

6. The computer-implemented method of claim 1, wherein the data indicative of current terrain topography includes data indicative of a quantity of material contained in the digging implement.

7. The computer-implemented method of claim 1, wherein the data indicative of current terrain topography includes data indicative of a composition of material contained in the digging implement.

8. The computer-implemented method of claim 1, wherein the map is three-dimensional.

9. The computer-implemented method of claim 1, wherein the map is 2.5-dimensional.

10. The computer-implemented method of claim 1, wherein the predefined distance is derived from one or more dimension of the map.

11. The computer-implemented method of claim 1, wherein the updating of the map according to the data indicative of current terrain topography includes updating a three-dimensional map of topography.

12. A system mountable on an unmanned ground vehicle (UGV) for controlling execution of an excavation task, comprising:
a scanning device configured to repeatedly scan an area surrounding the UGV, to thereby provide scanning output data providing information about distances between objects in the area and the UGV in a multiplicity of directions;
an inertial navigation system (INS) providing INS-data indicative of a current location and orientation of the UGV relative to a previous location and orientation;
at least one processor configured to:
obtain scanning output data generated by the scanning device;

generate based on the scanning output data, a map representing at least a part of the area, the map being relative to a location of the UGV, and comprises cells, each cell is classified to a class selected from a group comprising traversable and non-traversable, and characterized by dimensions equal or larger than an accumulated drift value of the INS over a predefined distance related to the size of the map;

receive INS data from the INS; and update a location of the UGV relative to the cells based on the INS-data;

execute an excavation sequence comprising:

moving a sensor-equipped digging implement for executing an excavation operation;

receiving data indicative of current terrain topography from the sensor;

updating the map according to the data indicative of current terrain topography;

calculating an excavation operation according to a difference between the map and a target map indicative of a desired result of the excavation task.

13. The system of claim 12, wherein the excavation sequence is executed by a second processor different than the at least one processor.

14. The system of claim 12, is configured to repeat the excavation sequence until the map is substantially identical to the target map.

15. The system of claim 12, wherein the sensor-equipped digging implement is adapted to provide terrain topography data pertaining to a location that is inaccessible to the scanning device.

16. The system of claim 12, wherein the data indicative of current terrain topography includes one or more of:

data indicative of a location of the digging implement;

data indicative of a quantity of material contained in the digging implement; or data indicative of current terrain topography includes data indicative of a composition of material contained in the digging implement.

17. The system of claim 12, wherein the map is three-dimensional.

18. The system of claim 12, wherein the map is 2.5-dimensional.

19. The system of claim 12, wherein the predefined distance is derived from one or more dimension of the map.

20. The system of claim 12, wherein the update of the map according to the data indicative of current terrain topography includes updating a three-dimensional map of topography.

21. An unmanned ground vehicle comprises and operable the system of claim 12.

22. A computer program product comprising a non-transitory computer readable storage medium retaining program instructions, which program instructions when read by a processor, cause the processor to perform a method executing an excavation task by an excavation vehicle, comprising:

obtaining scanning output data generated by a scanning device operating onboard the excavation vehicle for repeatedly scanning an area surrounding the vehicle, to thereby generate the scanning output data;

maintaining, based on the scanning output data, a map representing at least a part of the area, the map being relative to a location of the vehicle and comprises cells characterized by a size larger than an accumulated drift value of an INS onboard the vehicle over a predefined distance;

receiving from the INS, INS data indicative of a current location and orientation of the vehicle relative to a previous location and orientation; and updating a location of the vehicle relative to the cells in the map based on the INS data;

according to data from the scanning device, maintaining a map representing current terrain;

executing an excavation sequence comprising:

moving a sensor-equipped digging implement for executing an excavation operation;

receiving data indicative of current terrain topography from the sensor;

updating the map according to the data indicative of current terrain topography; and calculating an excavation operation according to a difference between the map and a target map indicative of a desired result of the excavation.

* * * * *